United States Patent [19]

Nasvytis

[11] 4,128,016
[45] Dec. 5, 1978

[54] HYBRID ROLLER GEAR TRANSMISSION
[76] Inventor: Algirdas L. Nasvytis, 10823 Magnolia Dr., Cleveland, Ohio 44106
[21] Appl. No.: 702,434
[22] Filed: Jul. 6, 1976
[51] Int. Cl.² ............................................. F16H 13/02
[52] U.S. Cl. ......................................... 74/206; 74/798
[58] Field of Search .................. 74/206, 208, 797, 798

[56] References Cited
U.S. PATENT DOCUMENTS

| 1,060,865 | 5/1913 | Sundh | 74/206 |
| 1,093,922 | 4/1914 | Dieterich | 74/206 |
| 1,127,313 | 2/1915 | Sundh | 74/206 |
| 1,212,462 | 1/1917 | Donnelly | 74/206 |
| 1,291,654 | 1/1919 | Morison | 74/206 |
| 1,985,645 | 12/1934 | Rosner | 74/206 |
| 2,970,491 | 2/1961 | Bertsch | 74/206 |
| 3,216,285 | 11/1965 | Nasvytis | 74/798 |
| 3,254,546 | 6/1966 | Nasvytis | 74/798 |
| 3,330,171 | 7/1967 | Nasvytis | 74/798 |
| 3,364,761 | 1/1968 | Nasvytis | 74/798 |
| 3,367,214 | 2/1968 | Nasvytis | 74/798 |
| 3,433,099 | 3/1969 | Nasvytis | 74/798 |
| 3,475,993 | 11/1969 | Hewko | 74/208 |

Primary Examiner—Samuel Scott
Assistant Examiner—William R. Henderson
Attorney, Agent, or Firm—Hill, Gross, Simpson, Van Santen, Steadman, Chiara & Simpson

[57] ABSTRACT

An inexpensive, lightweight, hybrid transmission is provided in which a high speed rotating-input sun member drives at least two rows of rollers including a first row of intermediate circumferentially positioned rollers by way of a pure friction drive contact. The first intermediate row similarly drives a second row of circumferentially mounted rollers via a pure friction drive contact. The second or subsequent row rollers are mounted on fixed axes by straddle bearings and the individual support shafts thereof are provided with small diameter output gears with positive teeth for cooperation with a toothed output ring or output bull gear. The system provides quiet and efficient force transfer through the friction drive surfaces and, at the same time, provides high torque transmission through the relatively slowly rotating positive drive gears. Automatically adjusting preload is provided by way of free-floating, non-torque-transmitting annular rings which automatically provide maximization of load distribution between the rollers.

7 Claims, 4 Drawing Figures

HYBRID ROLLER GEAR TRANSMISSION

BACKGROUND OF THE INVENTION

Transmission devices employing friction rollers for the transmission of power are well known in the art of gearing. Similarly, such transmissions employing drive transfer surfaces combining friction and positive torque-transmitting connection are known. Attention is drawn to applicant's prior U.S. Pat. No. 3,330,171 and U.S. Pat. No. 3,216,270. However, as those familiar with the art of light weight, high speed, gearing are aware, it has been extremely difficult to provide a transmission device having high mechanical efficiency, high ratio change, low noise output, and high torque transmission capabilities within moderate prices. The elimination of noise in drive systems is important from the point of view of permitting utilization of the system where excessive noise cannot be tolerated, and from the point of view of providing a vibrationless arrangement.

SUMMARY OF THE INVENTION

The hybrid drive of the present invention comprises a selected combination in sequence of friction and positive gear drive connections. Relatively high speed input drive contacts are in the form of pure friction rolling contact. Accordingly, a sun member is provided with a smooth cylindrical friction drive surface which contacts corresponding friction drive surfaces of a first row of circumferentially positioned roller members. The roller members are in turn in pure friction contact with a second row of circumferentially positioned rollers. The second row of rollers are, however, mounted for rotation individually by their support shafts between outboard, or straddle mounted, bearings. The shafts of the individual second row rollers provide the force output from the system, which is taken via a ring gear or bull gear. The shaft output and the ring or bull gear are provided with positive, toothed, gear drive contacts which, in view of the relatively slow speed thereof, provide a minimum noise level. As has been thoroughly discussed in my earlier patents, the provision of fixed bearings inherently provides a possible source of misalignment and/or uneven torque transmission between various of the rollers positioned around the sun member. In the present invention, a free-wheeling or floating preload annulus is provided. It operates to align the friction rollers to accurately position themselves with respect to each other, so that the everpresent tolerance inaccuracies in the bearing support will be rendered inconsequential. The rings contribute little to the losses since they do not transfer power. The transition from friction rollers to positive gears provides ideal torque distribution between the rollers since slippage can occur at the friction surfaces to accommodate any indexing mismatch during assembly.

This specific combination of elements has provided an extremely light weight torque transmission system having a very low noise level, high internal efficiency, and high torque transmitting capabilities over an extended life.

It is, accordingly, an object of the present invention to provide a novel, substantially improved and yet simplified light-weight hybrid friction-positive drive system.

DETAILED DESCRIPTION

Figure 1:
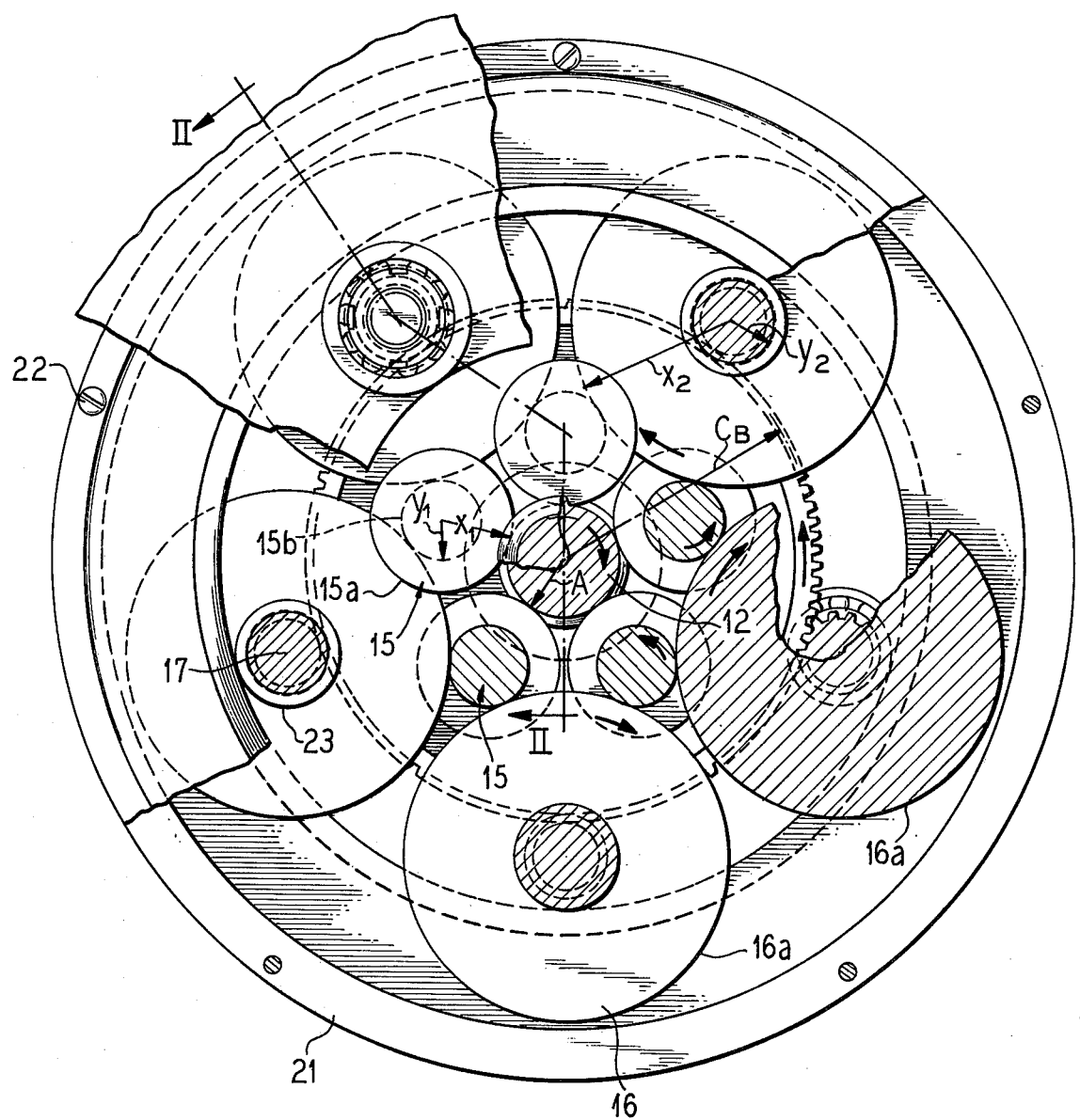
FIG. 1 is an end-elevational view, partially broken away of a transmission constructed in accordance with the present invention.

In accordance with a first embodiment of the present invention, an input shaft 10 suitably supported in a bearing 11 carries a generally cylindrical friction sun member 12. The bearings 11 are carried in a generally rigid support, housing member 13 which similarly supports spaced anti-friction bearings 14. As can be seen from FIG. 1, the sun member 12 is circumferentially surrounded by a first row of intermediate rollers 15 each of which is of a dual diameter, the input diameter being indicated at 15a and the output diameter being indicated at 15b. The intermediate row of rollers 15 is unsupported by bearings but is in drive contact with a second row of rollers each of which is indicated at 16. The input surfaces 16a of the individual rollers 16 are in contact with a pair of intermediate rollers 15 at their respective output surfaces 15b. Each roller 16 is supported upon its shafts 17 integral with, or keyed to, the roller 16. The shafts 17 are rotatably mounted in the straddle bearings 14 which are, as above indicated, fixedly mounted relative to the housing 13. Drive output from the system is accomplished via a bull gear 20 having an annular positive toothed circumference 19 in engagement with positive gear 18 carried by shafts 17. The output bull gear 20 may be rotatably supported in any conventional manner, such as, for example, by bearing 21.

In view of the above construction, the general placement of the individual rollers 16 is fixed in a circumferential and radial sense by the bearings 14. However, the preciseness of contact between the friction surfaces of the rollers 16 and the rollers 15 requires that a preload be applied in a manner establishing automatic load division between the individual rollers 16. This is accomplished in accordance with the present invention by a pair of free-floating annular rings 21 which are flanged and provided with bolts 22 to provide a dual annulus in a single integrated unit after assembly. The rings 21 are provided with curved surfaces 21a — which cooperate with corresponding curved surfaces 23a on the rollers 16. The curvature provides an automatic aligning characteristic so that axial loads are not applied to either the annular rings 21 or the rollers 16.

In operation, the system illustrated in FIG. 1 provides a high over-all ratio in accordance with the following formula:

$$R = (C_B X_1 X_2)/(A Y_1 Y_2)$$

Where $A$ is the radius of the sun, $C_B$ is the radius of the bull gear pitch circle, $X_1$ and $X_2$ are the respective input radii of the first and second row rollers, and $Y_1$, $Y_2$ are the respective output radii of the first and second row rollers.

Figure 2:
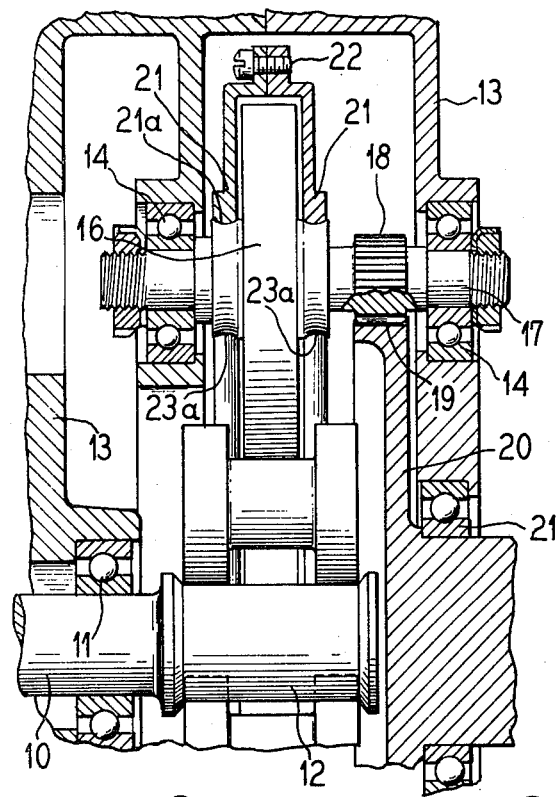
FIG. 2 is a cross-sectional view taken along the line II—II of the transmission shown in FIG. 1.

In accordance with the approximate dimensions of the structure as drawn in FIGS. 1 and 2, the above ratio is $$R = \frac{1.8125 \times .53125 \times 1.15625}{.40625 \times .28125 \times .28125} = 34.65$$

I have found that using such a two row system permits successful transmissions providing Ratios R of about 50.

Figure 4:
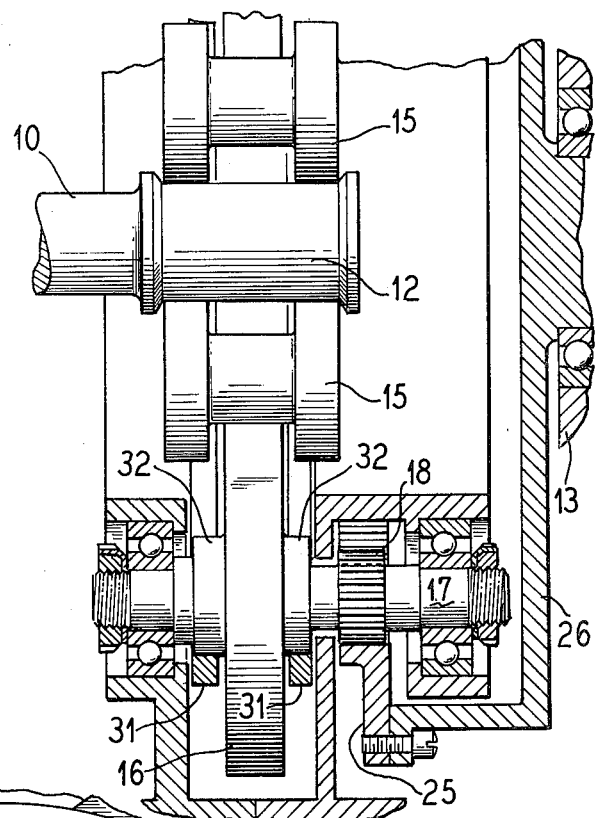
FIG. 4 is a cross-sectional view taken along the line IV—IV of FIG. 3.
Figure 3:
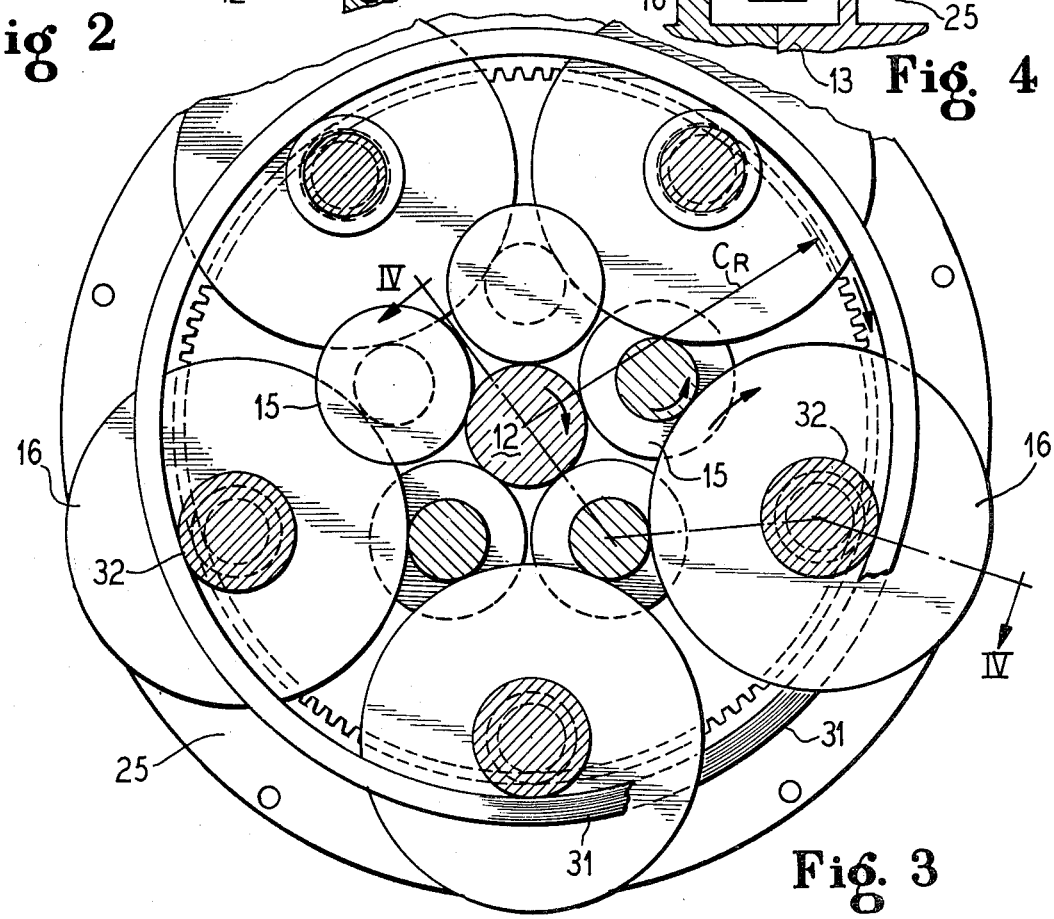
FIG. 3 is an end elevational view of a modified form of the transmission of the present invention, partially broken away.

A second embodiment of the invention is illustrated in FIGS. 3 and 4. There it will be observed that the sun member, the first intermediate row of rollers, and the second row of rollers are substantially the same as shown in FIGS. 1 and 2 and carry the same reference numerals. However, instead of employing a bull gear 20 as shown in FIGS. 1 and 2, a ring 25 is integrally secured to an output spider 26. Also, rather than an integrated or unitized pair of annular rings 21 as shown in FIG. 2, separate free-floating rings 31 are provided in contact with generally cylindrical surfaces 32 carried by the rollers 16. It may be observed that the individual rings 31 may be provided with curved surfaces as previously described with respect to rings 21 and, similarly, the rings 31 may be unitized by bolts such as shown at 22 in FIG. 2, if desired.

In view of the rearrangement of the toothed contact provided at the output of the transmission shown in FIGS. 3 and 4, the ratio is moderately different and is shown as $$R' = (C_R X_1 X_2)/(A Y_1 Y_2),$$

where $C_R$ is the radius of the ring gear pitch circle. Employing the same general proportion of parts as above described, and as illustrated in the drawings of this application, the ratio for the embodiment illustrated in FIGS. 3 and 4 is as follows:

$$R' = \frac{2.34375 \times .53125 \times 1.15625}{.40625 \times .28125 \times .28125} = 44.80$$

While the ratio R' is greater than R, the cost of a ring gear in the system is much greater than the cost of a bull gear since internal teeth are difficult to construct to accurate tolerances. In general, the present system provides great weight and cost reductions. For example, weight is required in direct relation to torque transmission and the high speed, low torque transmissions are in the friction gears while heavy torque is transferred at the slowly rotating positive gears 18. Thus, the system is light. High speed is only at the friction rollers and hence noise is minimal. Since the friction surfaces can, and will, slip, indexing of the parts is not critical, as it was in my earlier structure of U.S. Pat. No. 3,216,270, and the preload rings 21 act to equalize the loads throughout the rollers. This greatly reduces final cost of the system.

From the above, it will be seen that I have provided a simple transmission capable of using light weight components except at the outermost positive gear high ratio and low speed contacts, capable of self-aligning to distribute torque. Variation may, of course, be made without departing from my invention. For example, more than two rows of friction rollers may be used. In that event, only one row requires fixed axes 17. In a three row system a single stage reduction R of about 100 is possible. In view of such variations, and others, it is my intent that the scope of the invention be limited solely by the scope of the attached claims.

I claim as my invention:

1. In combination in a power transmission device, a friction roller sun gear member, a plurality of rows of friction rollers including, a first circumferential row of friction rollers in driven contact with said sun member, a second row of circumferential rollers in contact with said first row, each roller of said first row contacting a pair of said second row rollers, a pair of peripherally fixed anti-friction bearing means rotatably supporting each roller of the outermost row, and axially spaced on opposite sides of each such roller, annular free-floating preload distributing ring means encircling and contacting the outermost row of said friction rollers, and drive output positive pinion gear means carried by each of said outermost row rollers between said bearing means and in positive drive connection with an annular output gear, the contact between said friction rollers comprising solely friction contact and the positive pinion gear drive output means comprising solely toothed contact.

2. The structure of claim 1 wherein said output gear comprises a ring gear having radially inwardly projecting gear teeth engaging said pinion gear means.

3. The structure of claim 1 wherein said output gear comprises a bull gear having radially outwardly projecting gear teeth engaging said pinion gear means.

4. The structure of claim 1 wherein said preload ring means comprises a pair of rings engaging opposite ends of the outermost row rollers in free floating rolling engagement therewith and wherein said rings are rigidly attached to each other.

5. The structure of claim 1 wherein each of said first and second-row rollers have a ratio of input diameter to output diameter greater than one and the ratio of the outermost row is substantially greater than that of each inner row.

6. The structure of claim 1 wherein the outermost row is a second row.

7. In combination in a power transmission device, a friction roller sun gear member, a plurality of rows of friction rollers including a first circumferential row of friction rollers in friction contact with said sun member, a second row of circumferential rollers in friction contact with said first row rollers, each roller of said first row contacting a pair of said second row rollers, a pair of axially spaced peripherally fixed anti-friction bearing means rotatably supporting each roller of the outermost row of friction rollers on opposite sides of each such roller, annular free-floating preload distributing ring means encircling and contacting the outermost row of said friction rollers, and positive pinion gear drive means carried by each of said outermost row rollers between said bearing means and in positive gear drive connection with an annular power transfer gear, the contact between said friction rollers comprising solely friction contact and the positive gear drive connection comprising solely toothed contact.

* * * * *